US011060550B2

(12) United States Patent
Hino (10) Patent No.: US 11,060,550 B2
(45) Date of Patent: Jul. 13, 2021

(54) SHEET PROCESSING APPARATUS (71) Applicant: CANON KABUSHIKI KAISHA, Tokyo (JP)

(72) Inventor: Takeshi Hino, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 419 days.

(21) Appl. No.: 16/204,369

(22) Filed: Nov. 29, 2018

(65) Prior Publication Data
US 2019/0170181 A1 Jun. 6, 2019

(30) Foreign Application Priority Data
Dec. 6, 2017 (JP) .............................. JP2017-234280

(51) Int. Cl.
H04N 1/00 (2006.01)
F16B 39/24 (2006.01)

(52) U.S. Cl.
CPC .............. F16B 39/24 (2013.01); H04N 1/00 (2013.01); H04N 1/0057 (2013.01); H04N 1/00519 (2013.01); H04N 1/00538 (2013.01); H04N 1/00554 (2013.01); H04N 2201/02495 (2013.01); H04N 2201/0446 (2013.01)

(58) Field of Classification Search
CPC .. H04N 1/00554; H04N 1/00; H04N 1/00519; H04N 2201/0446; H04N 2201/02495
See application file for complete search history.

(56) References Cited

U.S. PATENT DOCUMENTS

| 6,321,063 | B1* | 11/2001 | Tanaka | G03G 15/60 399/367 |
| 9,284,138 | B2 | 3/2016 | Hino | |
| 2002/0061212 | A1* | 5/2002 | Tanaka | G03G 15/605 399/379 |
| 2003/0007199 | A1* | 1/2003 | Ogata | H04N 1/00909 358/505 |
| 2006/0146375 | A1* | 7/2006 | Baek | H04N 1/1017 358/474 |
| 2007/0047028 | A1* | 3/2007 | Hashimoto | H04N 1/00543 358/498 |
| 2007/0195381 | A1* | 8/2007 | Yamazaki | H04N 1/00543 358/502 |
| 2008/0158589 | A1* | 7/2008 | Su | H04N 1/00519 358/1.15 |
| 2008/0291501 | A1* | 11/2008 | Shiraki | H04N 1/00559 358/401 |
| 2013/0088762 | A1* | 4/2013 | Yamazaki | H04N 1/00591 358/498 |
| 2013/0089365 | A1* | 4/2013 | Yamazaki | H04N 1/00543 399/367 |
| 2016/0306314 | A1* | 10/2016 | Suto | G03G 15/6529 |
| 2017/0134598 | A1* | 5/2017 | Nagano | G03G 21/1619 |
| 2018/0257883 | A1* | 9/2018 | Oyama | B65H 3/0653 |

FOREIGN PATENT DOCUMENTS

JP H10-019025 A 1/1998

* cited by examiner

Primary Examiner — Ted W Barnes
(74) Attorney, Agent, or Firm — Venable LLP (57) ABSTRACT A handle mounted to a shaft with a fixing member has a first surface that comes in contact with the shaft and receives an operation force applied to the handle and a second surface in which the fixing member is arranged.

20 Claims, 6 Drawing Sheets

SHEET PROCESSING APPARATUS

BACKGROUND OF THE INVENTION

Field of the Invention

The present invention relates to a sheet processing apparatus for processing a sheet.

Description of Related Art

As an image reading apparatus as an example of a sheet processing apparatus, an image reading apparatus provided with an ADF for feeding an original sheet by sheet is widely used. The ADF is rotatably supported with a hinge by an apparatus main body of the image reading apparatus provided with a platen glass. In a case where the original is manually placed on the platen glass without using the ADF, the ADF is opened and the original is placed on the platen glass. After that, the ADF is closed and the original is pressed with a lower surface of the ADF. In this state, a start key for starting reading is pressed to start image reading.

The ADF is locked by a locking unit at a closed position with respect to the apparatus main body. A handle for releasing the lock of the locking unit is mounted to the ADF. In an opening operation of the ADF, the handle is operated to release the lock, thereby to open the ADF.

Japanese Patent Laid-Open No. H10-19025 discloses an apparatus in which a handle operated by an operator is mounted to a shaft.

Japanese Patent Laid-Open No. H 10-19025 has no consideration for deformation of the handle due to an operation force to the handle. If the handle is deformed when the handle is operated, for example, the operability of the handle may be deteriorated.

SUMMARY OF THE INVENTION

A sheet processing apparatus according to the present invention is a sheet processing apparatus comprising a movable unit and an engaging/releasing device that fixes the movable unit to a predetermined position or releases the fixation. The engaging/releasing device includes a shaft rotatable around a shaft line, a locking unit mounted to the shaft and configured to restrict movement of the movable unit at a predetermined angle of the shaft or release the restriction and a handle mounted to the shaft with a fixing member and configured to rotate the shaft. Then, the handle has a first surface that comes in contact with the shaft and receives an operation force applied to the handle and a second surface in which the fixing member is arranged.

According to the present invention, deformations of the handle are suppressed.

Further features of the present invention will become apparent from the following description of exemplary embodiments with reference to the attached drawings.

DESCRIPTION OF THE EMBODIMENTS

<Overall Configuration of Image Reading Apparatus>

Figure 1:
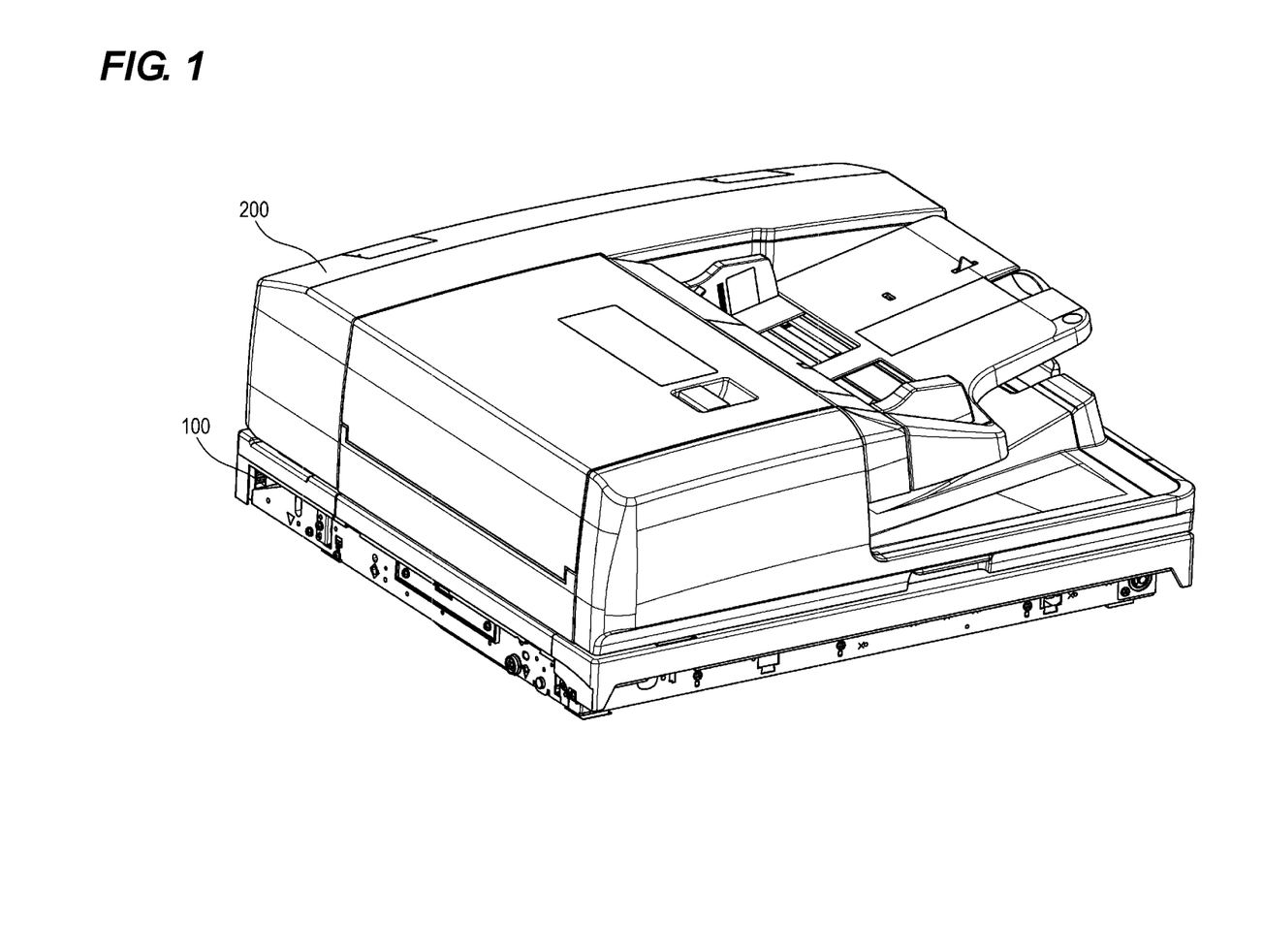
FIG. 1 is an overall view of an image reading apparatus according to the present invention.
Figure 2:
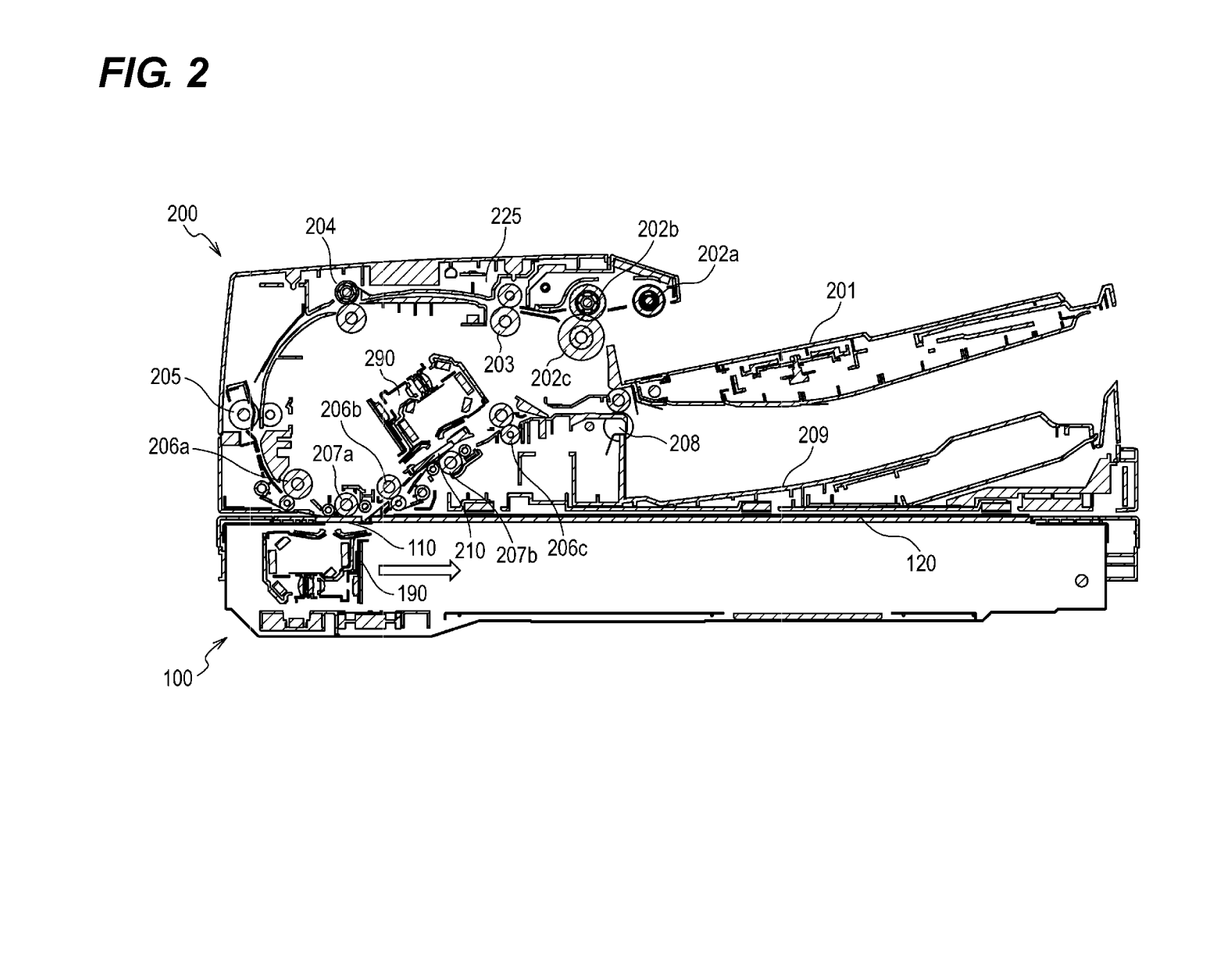
FIG. 2 is a cross-sectional view of an ADF.

FIG. 1 is a perspective view of an image reading apparatus that performs processing of reading an image of an original, the image reading apparatus being an example of a sheet processing apparatus according to the present invention. FIG. 2 illustrates a cross-sectional view of the image reading apparatus. The image reading apparatus includes a scanner portion 100 as an apparatus main body and an auto document feeder (ADF) 200 as a movable unit that is freely movable and is freely openable/closable with respect to the scanner portion 100, and feeds an original as a sheet.

<ADF>

A configuration of the ADF 200 will be described with reference to FIG. 2. The ADF 200 includes an original tray 201 at an upper portion. When a user places an original bundle on the original tray 201 and starts a copy or scan operation, a motor is driven and the original on the original tray 201 is sequentially sent out from an uppermost sheet by a sheet feeding roller 202a. The sent-out original is separately fed sheet by sheet by a pair of separation rollers 202b and 202c. The separately fed original is conveyed by pairs of rollers 203, 204, 205, 206a, 206b, and 206c. Then, an image is read by a reading unit 190 of the scanner portion 100 when the original passes through a gap between a skimming glass 110 and a platen roller 207a of the scanner portion 100. An image on a back surface of the original is read by a back surface reading unit 290 when the original on a back surface skimming glass 210. The original from which the images have been read is discharged onto a discharge tray 209 by a discharge roller 208. In the ADF 200, a cover 225 provided with a conveying guide inside is opened to open a conveying path.

Figure 3:
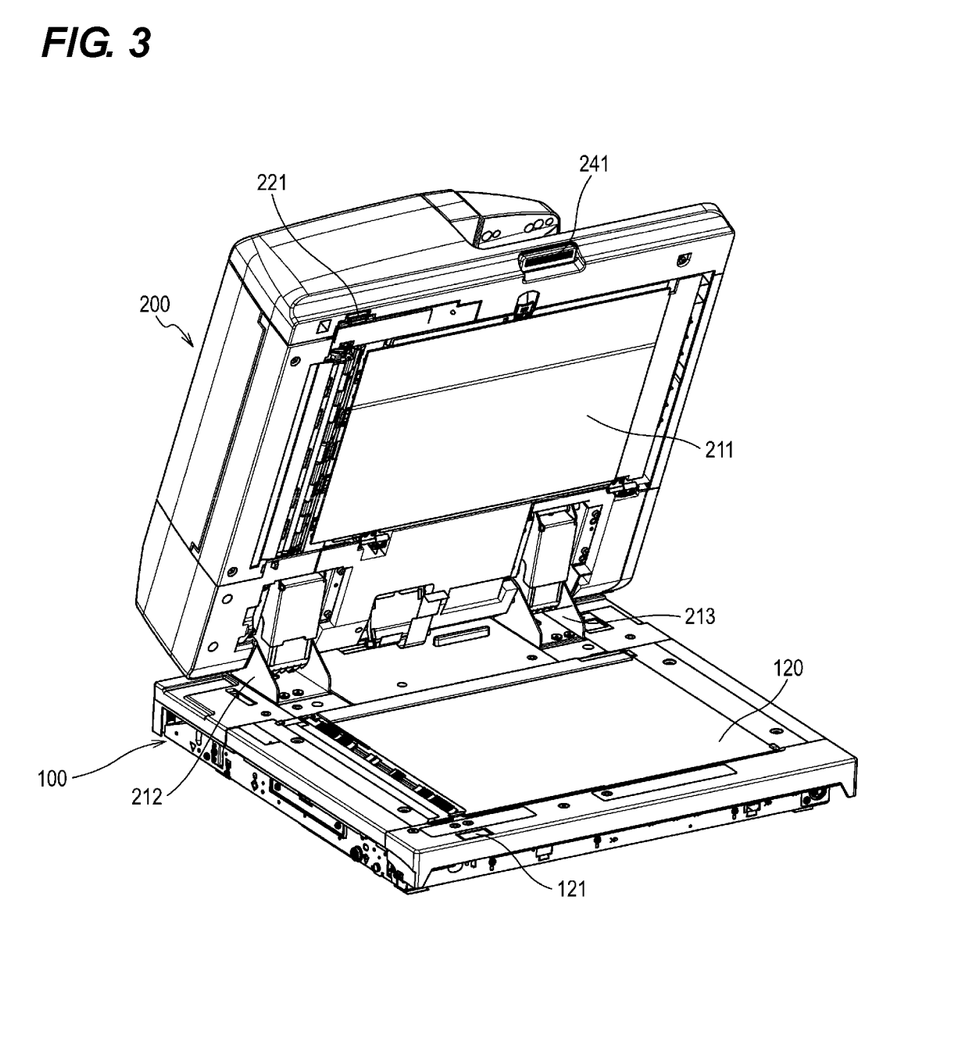
FIG. 3 is an overall view of the image reading apparatus in a state where the ADF is opened.

As illustrated in FIG. 3, the ADF 200 is rotatably supported by the scanner portion 100 with hinges 212 and 213. In the ADF 200, an original pressing plate 211 for pressing the original placed on the scanner portion 100 is arranged.

<Scanner Portion>

A configuration of the scanner portion 100 will be described. As illustrated in FIG. 2, the reading unit 190 movable by a motor (not illustrated) is arranged in the scanner portion 100. The reading unit 190 is stopped at a predetermined position (the position illustrated in FIG. 2) and can read the image of the original conveyed on the skimming glass 110 by the ADF 200.

A platen glass 120 is arranged on an upper surface of the scanner portion 100. When the ADF 200 is opened as illustrated in FIG. 3, the platen glass 120 is exposed. When the user closes the ADF 200 after placing the original on the platen glass 120, the original is pressed by the original pressing plate 211 of the ADF 200. The reading unit 190 is moved in a direction of the white arrow in FIG. 2 along a lower surface of the platen glass 120 in the state where the ADF 200 is closed, thereby to read the image of the original placed on the platen glass 120.

<Locking and Opening/Closing Operation of ADF>

To improve the reading quality of the image of the original conveyed by the ADF 200, the gap between the skimming glass 110 and the platen roller 207a needs to be appropriately maintained. When the conveyed original is read, the ADF 200 is favorably in a completely closed state without floating with respect to the scanner portion 100. Further, when the image of the original placed on the platen glass 120, the ADF 200 plays a role to press the original on the platen glass 120 by the original pressing plate 211 with an appropriate pressure to prevent displacement of the original being read. Therefore, in a case where the ADF 200 is closed with respect to the scanner portion 100, the ADF 200 is favorably fixed at a closed position as a predetermined position.

In recent years, the weight of the ADF 200 tends to increase in order to increase a conveyance speed of the original and to enable the ADF 200 to convey the original with a large basis weight. To facilitate the operation of the user to open the ADF 200 having a large weight, a spring that applies a force to a direction of opening the ADF 200 are arranged in the hinges 213 and 212 of the ADF 200. With a force of the spring, the heavy ADF 200 can be smoothly lifted up. In the present embodiment, to facilitate the opening operation, the force of the spring that applies the force to the direction of opening the ADF 200 is set to be larger than the ADF 200's own weight. When the force of the spring applied to the direction of opening the ADF 200 is set to be larger than the ADF 200's own weight as described above, only the ADF 200's own weight cannot maintain the closed state of the ADF 200 with respect to the scanner portion 100.

Therefore, in the present embodiment, a magnet catch is provided as a locking unit for holding the ADF 200 at the closed position. Specifically, as illustrated in FIG. 3, a magnet 221 is arranged in the ADF 200 and a soft magnetic body 121 is arranged in the scanner portion 100. Then, the ADF 200 is locked at a predetermined closed position as the magnet 221 and the soft magnetic body 121 attract each other, that is, by a magnetic force.

When the user opens the ADF 200, the user rotates a handle 241 illustrated in FIG. 3 to release the engagement (locking) between the magnet 221 and the soft magnetic body 121. Hereinafter, a configuration of the handle 241 and a configuration for attaching the handle 241 will be described in detail with reference to FIGS. 4 and 5.

<Description Regarding Configuration of Handle and Attachment of Handle to Rotating Shaft>

Figure 4:
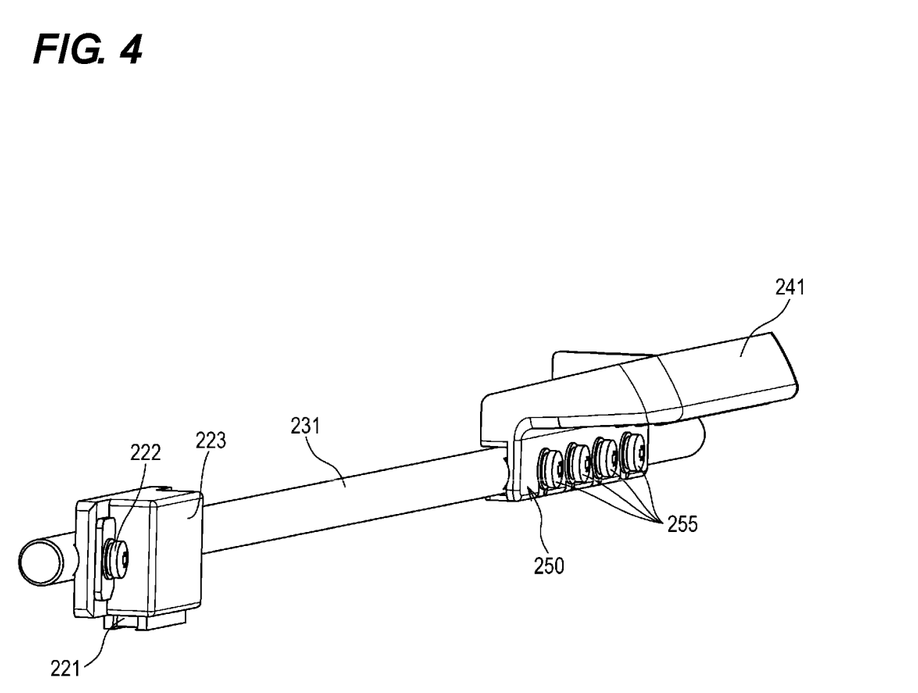
FIG. 4 is a view illustrating a configuration of a handle and a rotating shaft.

As illustrated in the perspective view of FIG. 4, the resin-made handle 241 and a magnet holder 223 holding the magnet 221 are mounted to a rotating shaft 231 that is a metal-made shaft. The rotating shaft 231 is rotatably held around a shaft line by the ADF 200 via a bearing. The rotating shaft 231, the handle 241, and the magnet 221 as a locking member constitute an engaging/releasing device.

The handle 241 is fixed to one end portion in a shaft line direction of the rotating shaft 231 with a plurality of screws 255 as fixing members. The magnet holder 223 is fixed to the other end portion in the shaft line direction of the rotating shaft 231 with a screw 222.

Figure 5:
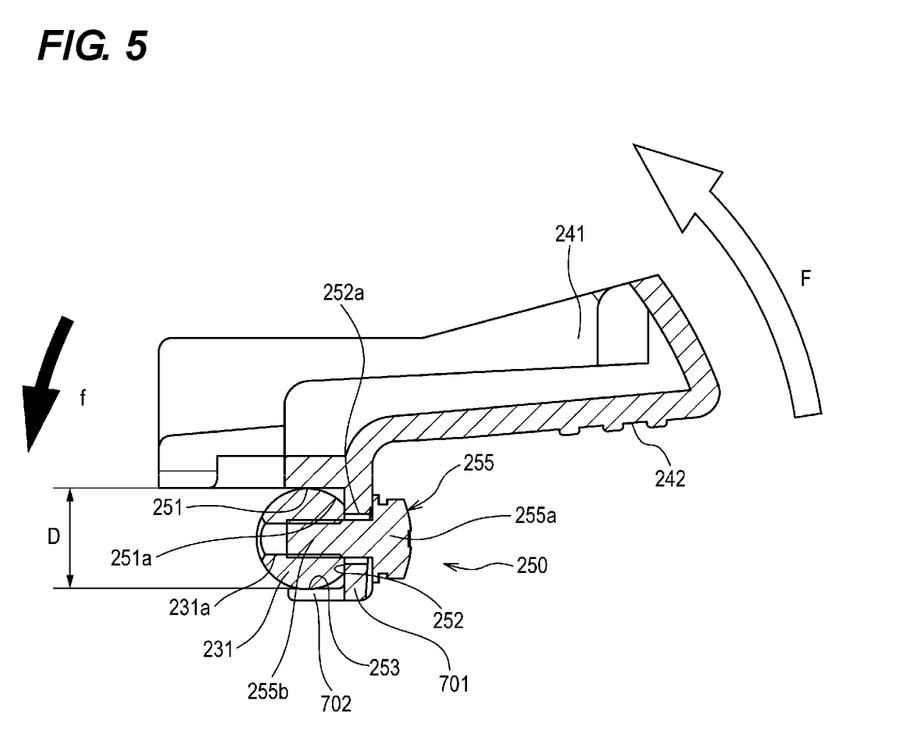
FIG. 5 is a cross-sectional view illustrating the configuration of the handle and the rotating shaft.

As illustrated in FIG. 5, the handle 241 is a handle of the user and provided with a handle operation portion 242 as a receiving portion that receives an operation force from the user. Further, the handle 241 includes a handle fixing portion 250 for fixing the handle 241 to the rotating shaft 231. The handle fixing portion 250 has a U shape as viewed in section vertical to the shaft line of the rotating shaft 231. The handle fixing portion 250 includes a first fixing surface 251 as a first surface, a second fixing surface 252 as a second surface, and a third fixing surface 253 as a third surface.

The first fixing surface 251 as a contact portion is arranged between the rotating shaft 231 and the handle operation portion 242. The second fixing surface 252 is provided on a plate-like portion 701 to which the screw 255 is mounted. A fixing hole 252a for allowing the screw 255 to be inserted is formed in the plate-like portion 701 having the second fixing surface 252. The third fixing surface 253 is provided on an elastic portion 702 extending substantially perpendicularly to the second fixing surface 252 from an end portion of the second fixing surface 252 (an end portion of the plate-like portion 701). The third fixing surface 253 is arranged on an opposite side of the first fixing surface 251 across the rotating shaft 231.

A portion in an outer peripheral portion of the rotating shaft 231, the portion coming in contact with the first fixing surface 251, is located on a downstream side in a direction F into which the rotating shaft 231 rotates by an operation of the user, with respect to a portion in the outer peripheral portion of the rotating shaft 231, the portion coming in contact with the second fixing surface 252. Further, an arc shape 251a along an outer peripheral surface of the rotating shaft 231 is formed in the first fixing surface 251 on a side of the second fixing surface 252.

The first fixing surface 251 and the third fixing surface 253 face each other with a distance D therebetween. The distance D is smaller than a shaft diameter of the rotating shaft 231 in a state where the rotating shaft 231 is not arranged between the first fixing surface 251 and the third fixing surface 253. The fixing hole 252a formed in the second fixing surface 252 is a long round hole having a major axis in a direction along a rotating direction of the rotating shaft 231 or in a radial direction of the rotating shaft 231 in a direction connecting the first fixing surface 251 and the third fixing surface 253.

A screw hole (tap hole) 231a is formed in the rotating shaft 231. The screw hole 231a extends in a direction intersecting with the shaft line of the rotating shaft 231. A portion where the screw hole 231a is formed and coming in contact with the second fixing surface 252 in an outer periphery of the rotating shaft 231 is processed to be flat.

The screw 255 for fixing the handle 241 to the rotating shaft 231 has a male screw portion (shaft portion) 255b and a head portion 255a larger than the fixing hole 252a. The male screw portion (shaft portion) 255b is inserted into the fixing hole 252a provided in the second fixing surface 252 and the screw hole 231a of the rotating shaft 231.

The handle 241 is mounted to the rotating shaft 231 by turning the head portion 255a of the screw 255 using a tool such as a screwdriver. That is, when the screw 255 is turned, the plate-like portion 701 of the handle 241 is nipped by the head portion 255a and the rotating shaft 231 into which the male screw portion 255b is inserted, whereby the handle 241 is fixed to the rotating shaft 231. In other words, the second fixing surface 252 of the plate-like portion 701 and the flat portion (pressing portion) of the outer periphery of the rotating shaft 231 are pressed by the screw 255, whereby the handle 241 is mounted to the rotating shaft 231.

As described above, since the fixing hole 252a is the long round hole having the major axis in the radial direction of the rotating shaft 231, the position of the handle 241 with respect to the rotating shaft 231 has a degree of freedom in a direction parallel to the second fixing surface 252 and along the radial direction of the rotating shaft 231. In the present embodiment, since the distance D between the first fixing surface 251 and the third fixing surface 253 is smaller than the diameter of the rotating shaft 231, the elastic portion 702 including the third fixing surface 253 receives a force in a D direction by the rotating shaft 231 and is elastically deformed. The rotating shaft 231 is pressed against the first fixing surface 251 by a restoration force of the elastically deformed elastic portion 702 (the third fixing surface 253). In this way, in the present embodiment, the rotating shaft 231 can be reliably brought into close contact with the first fixing surface 251, using an elastic force associated with the deformation of the third fixing surface 253.

In the state where the ADF 200 is closed, the magnet 221 attracts the soft magnetic body 121. To open the ADF 200, the user operates the handle operation portion 242 to move upward the handle operation portion 242 as the receiving portion that receives the operation force of the user. The handle 241 rotates about the shaft line of the rotating shaft 231 in the direction of the arrow F in FIG. 5 by the upward movement of the handle operation portion 242. When the rotating shaft 231 rotates, the magnet 221 is separated from the soft magnetic body 121. As the magnet 221 is separated from the soft magnetic body 121, the lock of the ADF by the magnetic force is released, and the ADF 200 can be opened as illustrated in FIG. 2.

Here, the first fixing surface 251 is arranged to receive an operation force (a force in the direction of the arrow f) applied from the handle 241 to the rotating shaft 231 when the rotating shaft 231 rotates in the direction of the arrow F by the operation of the user on the handle 241. With the arrangement, functions and effects that deformation of the handle fixing portion 250 is in particular suppressed when the handle 241 is operated, and the operational feeling is improved and occurrence of fatigue fracture of the handle 241 can be suppressed can be exerted. The functions and effects will be described below in comparison with a comparative example illustrated in FIG. 6.

Figure 6:
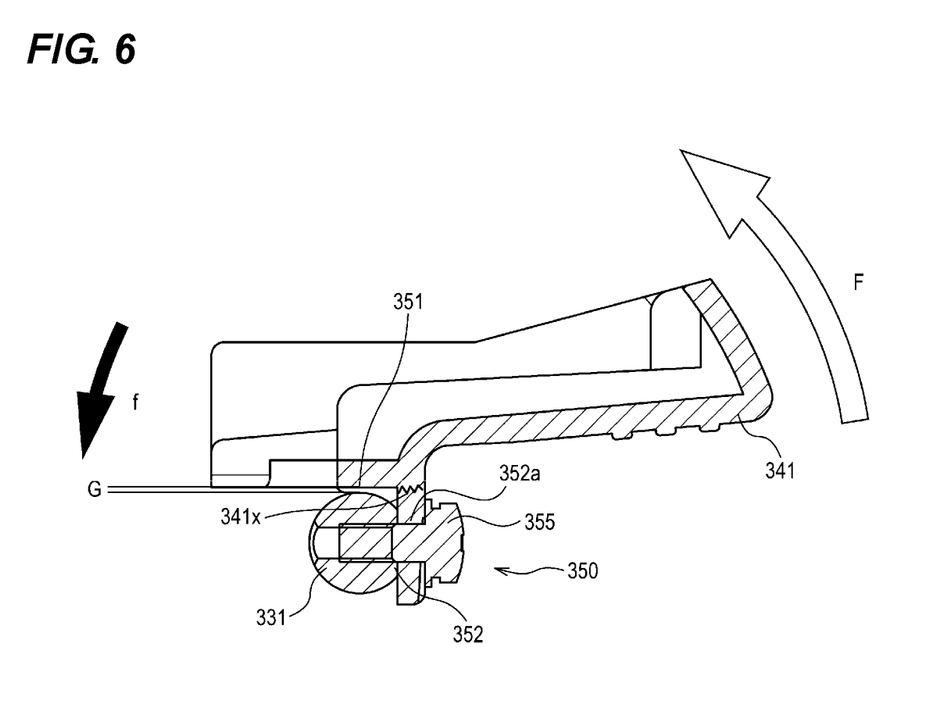
FIG. 6 is an explanatory diagram for describing a configuration of a comparative example.

In the comparative example in FIG. 6, a handle 341 is fixed to a shaft 331 with a screw 355. A hole 352a for the screw 355 is formed in the handle 341. The hole 352a is a round hole having the same diameter as the shaft portion of the screw 255. A gap G is formed between an upper portion of an outer periphery of the shaft 331 and a portion 351 of the handle 341, the portion facing the upper portion of the shaft 331.

In this comparative example, when a user turns the handle 341, the handle 341 is deformed by an operation force. That is, the handle 341 receives a force in the direction of the arrow F and is deformed such that the gap G becomes small with respect to the shaft 331, rotation of which is restricted by absorptive power of a magnet catch. If the handle 341 is deformed, the shaft 331 rotates with a delay with respect to the operation on the handle 341. Therefore, the lock of the magnet catch is released with a delay with respect to the operation of the handle 341. Therefore, the operational feeling of the handle 341 is not good. Further, the deformation of the handle 341 is repeated as the operation of the handle 341 is repeated. Therefore, there is a possibility that fatigue fracture occurs in a fracture portion 341X, for example.

In the present embodiment, the first fixing surface 251 receives the force (the force in the direction of the arrow f in FIG. 5) as described above, and thus the deformation of the handle 241 due to the operation force is less likely to occur, as compared with the comparative example. Since the handle 241 is less easily deformed, the rotating shaft 231 integrally rotates with the operation of the handle 241. Therefore, in the present embodiment, the operational feeling when the lock is released by the handle 241 is better than the comparative example in FIG. 6. Further, in the present embodiment, occurrence of fatigue fracture of the handle 241 can be suppressed as compared with the comparative example.

In the present embodiment, even with a simple configuration in which the handle 241 is fixed to the rotating shaft 231 using the screw 255, the integrated feeling of the rotating shaft 231 and the handle 241 can be improved without relying on the strength of the handle 241 and the number of the screws 255. Further, the durability of the handle 241 can be improved. Further, in assembling the handle 241, special jigs and tools are not required, and thus the mounting operation is also easy.

Note that, in the above embodiment, the example in which the rotating shaft 231 is brought into contact with the first fixing surface 251 using the elastic force of the elastic portion 702 provided with the third fixing surface 253 has been described. In this embodiment, although the first fixing surface 251 can be reliably brought into close contact with the rotating shaft 231, the elastic portion 702 (the third fixing surface 253) is not necessarily required. In other words, if the first fixing surface 251 comes in contact with a portion of the outer periphery of the rotating shaft 231, the portion being different from the contact portion (pressing portion) with the second fixing surface 252, the deformation of the handle 241 associated with the operation force can be prevented.

Further, in the above embodiment, the example in which the portion in the outer periphery of the rotating shaft 231, the portion facing the second fixing surface 252, is made flat has been described. However, it goes without saying that the portion in the outer periphery of the rotating shaft 231, the portion facing the second fixing surface 252, may have an arc shape.

In the above description, the magnet catch provided with the magnet and the magnetic body has been exemplified as the locking unit for holding the ADF 200 in the closed state. However, the locking unit for holding the ADF 200 in the closed state is not limited to the magnet catch and may be a form for locking the ADF 200 by engagement with a hook and a pin, for example. In this case, for example, the hook is fixed to a shaft swingably mounted to the ADF 200. Meanwhile, the pin to be engaged with the hook is provided in the scanner portion 100. The shaft is rotated about the shaft line by an applied force of the spring so that the hook is engaged with the pin. The engagement (lock) of the hook and the pin is released by operating the handle provided on the shaft against the applied force of the spring.

Note that the ADF 200 has been exemplarily illustrated as the freely movable unit. However, the present invention is not limited to the ADF 200. For example, a cover (movable unit) 225 provided in the ADF 200 and is opened to open a conveying path is locked at a closed position A handle mounted to the above-described rotating shaft 231 may be adopted as the handle for releasing the lock.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-234280, filed Dec. 6, 2017, which is hereby incorporated by reference herein in its entirety.

What is claimed is:

1. A sheet processing apparatus comprising:
    a movable unit; and
    an engaging/releasing device that fixes the movable unit to a predetermined position or releases the fixation,
    the engaging/releasing device including:
        a shaft rotatable around a shaft line;

a locking unit mounted to the shaft and configured to restrict movement of the movable unit at a predetermined angle of the shaft or release the restriction; and a handle mounted to the shaft with a fixing member and configured to rotate the shaft, wherein the handle has a first surface that comes in contact with the shaft and receives an operation force applied to the handle and a second surface in which the fixing member is arranged.

2. The sheet processing apparatus according to claim 1, wherein the handle further includes an elastic portion having a third surface facing the first surface across the shaft, and a restoration force of the elastically deformed elastic portion is applied to the shaft toward the first surface.

3. The sheet processing apparatus according to claim 1, wherein the fixing member is a screw.

4. The sheet processing apparatus according to claim 3, wherein the second surface has a hole into which a shaft portion of the screw is inserted, and the hole is a long hole long along a rotating direction of the shaft.

5. The sheet processing apparatus according to claim 4, wherein the shaft has a screw hole extending along a direction intersecting with the shaft line and into which the shaft portion of the screw is inserted, the second surface and an outer peripheral portion of the shaft are pressed with the screw, and the first surface is a surface along a direction into which the shaft portion of the screw extends and comes in contact with the outer peripheral portion of the shaft.

6. The sheet processing apparatus according to claim 5, wherein a portion in the outer peripheral portion of the shaft, the portion coming in contact with the first surface, is located at a downstream side in a direction into which the shaft rotates when the handle receives the operation force, with respect to a portion in the outer peripheral portion of the shaft, the portion coming in contact with the second surface.

7. The sheet processing apparatus according to claim 1, wherein the locking unit locks the movable unit at the predetermined position, using a magnetic force.

8. The sheet processing apparatus according to claim 1, wherein a portion of the shaft, the portion coming in contact with the second surface, is flat.

9. The sheet processing apparatus according to claim 1, wherein the movable unit is a conveying apparatus that conveys a sheet, and the conveying apparatus performs processing of reading an image of the conveyed sheet.

10. A sheet processing apparatus comprising:
a rotatably mounted shaft; and
a handle mounted to the shaft to rotate the shaft,
the sheet processing apparatus being configured to process a sheet,
the sheet processing apparatus further comprising:
a first portion provided to the handle and in which a first hole is provided;

a screw having a shaft portion inserted into the first hole provided in the first portion and a second hole provided in the shaft, and configured to press a pressing portion on an outer periphery of the shaft and the first portion of the handle; and a second portion provided to the handle, the second portion coming in contact with the outer periphery of the shaft at a position different from the pressing portion of the shaft in a peripheral direction.

11. The sheet processing apparatus according to claim 10, wherein the handle further includes an elastic portion facing the second portion across the shaft, and a restoration force of the elastically deformed elastic portion is applied to the shaft toward the second portion.

12. The sheet processing apparatus according to claim 10, wherein a portion of the shaft, the portion coming in contact with the first portion of the handle, is flat.

13. A sheet processing apparatus comprising:
a movable unit; and
a lock unit that locks the movable unit at a predetermined position,
the lock unit including:
a rotatable shaft;
a locking portion provided to the shaft and configured to restrict movement of the movable unit; and
a handle mounted to the shaft with a fixing member, wherein the locking portion is able to be moved to a position where the locking portion does not restrict the movement of the movable unit when the handle is operated to rotate the shaft, and the handle has a first surface that comes in contact with the shaft and receives an operation force applied to the handle and a second surface in which the fixing member is arranged.

14. The sheet processing apparatus according to claim 13, wherein the handle further includes an elastic portion having a third surface facing the first surface across the shaft, and a restoration force of the elastically deformed elastic portion is applied to the shaft toward the first surface.

15. The sheet processing apparatus according to claim 13, wherein the fixing member is a screw.

16. The sheet processing apparatus according to claim 15, wherein the second surface has a hole into which a shaft portion of the screw is inserted.

17. The sheet processing apparatus according to claim 15, wherein the shaft has a screw hole extending along a direction intersecting with a shaft line and into which a shaft portion of the screw is inserted, the second surface and an outer peripheral portion of the shaft are pressed with the screw, and a virtual surface perpendicular to a direction into which the shaft portion of the screw extends intersects with the first surface.

18. The sheet processing apparatus according to claim 13, wherein a portion in the outer peripheral portion of the shaft, the portion coming in contact with the first surface, is located at a downstream side in a direction into which the shaft rotates when the handle receives the operation force, with respect to a portion in the outer peripheral portion of the shaft, the portion coming in contact with the second surface.

19. The sheet processing apparatus according to claim 13, wherein
   the lock unit locks the movable unit at the predetermined position, using a magnetic force.

20. The sheet processing apparatus according to claim 13, wherein
   the movable unit is a conveying apparatus that conveys a sheet, and
   the sheet processing apparatus performs processing of reading an image of the sheet conveyed by the conveying apparatus.

* * * * *